(12) United States Patent
Horesh et al.

(10) Patent No.: US 9,946,629 B2
(45) Date of Patent: Apr. 17, 2018

(54) SYSTEM, METHOD AND APPARATUS FOR DERIVING ROOT CAUSE FOR SOFTWARE TEST FAILURE

(71) Applicant: International Business Machines Corporation, Armonk, NY (US)

(72) Inventors: Lior Horesh, North Salem, NY (US); Raya Horesh, North Salem, NY (US); Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/162,979

(22) Filed: May 24, 2016

(65) Prior Publication Data

US 2017/0344459 A1 Nov. 30, 2017

(51) Int. Cl.
*G06F 9/44* (2006.01)
*G06F 11/00* (2006.01)
*G06F 11/36* (2006.01)

(52) U.S. Cl.
CPC ...... *G06F 11/3644* (2013.01); *G06F 11/3612* (2013.01); *G06F 11/3688* (2013.01); *G06F 11/3692* (2013.01)

(58) Field of Classification Search
CPC .............. G06F 11/3612; G06F 11/3644; G06F 11/3688; G06F 11/3692
USPC ........................... 717/124–135; 714/37, 38.1
See application file for complete search history.

(56) References Cited

U.S. PATENT DOCUMENTS

| 6,862,696 | B1 | 3/2005 | Voas et al. |
| 7,676,775 | B2 | 3/2010 | Chen |
| 8,001,527 | B1 | 8/2011 | Qureshi et al. |
| 2003/0023860 | A1* | 1/2003 | Eatough .................... G06F 8/65 713/189 |
| 2005/0144532 | A1* | 6/2005 | Dombrowa ......... G06F 11/0751 714/39 |
| 2011/0029819 | A1* | 2/2011 | Mehta ................. G06F 11/3644 714/38.12 |

(Continued)

OTHER PUBLICATIONS

A. Vahagzadeh et al., "An Empirical Study of Bugs in Test Code", ICSME 2015, Bremen, Germany, 2015 IEEE.

(Continued)

*Primary Examiner* — Qing Chen
(74) *Attorney, Agent, or Firm* — Harrington & Smith

(57) ABSTRACT

For a program of interest represented as a sequence of states comprising variables and flags wherein controls transition the program from state to state, and wherein the program includes tests at prescribed locations in the program that are applied upon specific states and generate observables, a method includes inserting at different points in the program hooks that capture program runtime behaviors constituting classification features. The method further includes flattening the program states, commands and tests along a program run-time timeline, and identifying a root cause of a program failure by backtrack analyzing a stream of input states and commands and output consequent states, commands and test results to detect causal correlations between variables, states and commands. The step of backtrack analyzing includes determining joint conditional probabilities and identifying candidate failure root causes that maximize conditional probabilities.

18 Claims, 3 Drawing Sheets

(56) References Cited

U.S. PATENT DOCUMENTS

2013/0097463 A1* 4/2013 Marvasti ............... G06F 11/079
 714/47.1
2014/0123108 A1 5/2014 Rajagopalan
2016/0337226 A1* 11/2016 Padala ................... H04L 43/10

OTHER PUBLICATIONS

IP.COM, "Intelligent Root-Cause and Defect Analysis", an [P.com Prior Art Database Technical Disclosure, Publication Date Oct. 5, 2015, IP.com No. IPCOM000243596D.

IP.COM, "Repeatable Failure Data Capture—Framework to Aid in Root Cause Analysis", an IP.com Prior Art Database Technical Disclosure, Publication Date Jul. 25, 2014, 6, IP.com No. IPCOM000238007D.

* cited by examiner

SYSTEM, METHOD AND APPARATUS FOR DERIVING ROOT CAUSE FOR SOFTWARE TEST FAILURE

TECHNICAL FIELD

The embodiments of this invention relate generally to software engineering and, more specifically, relate to computer program development and testing methods, systems, apparatus and computer software that is configured to discover a cause of a program failure in order to correct the program failure.

BACKGROUND

Testing is an important element in a software development lifecycle (SDLC) as it ensures stability of the computer program code and enables early identification of regressions. A regression can be considered as a code failure induced by a change to the code, e.g., an attempt to fix a bug in one portion of the code might cause a code failure at the same general location as the bug or elsewhere. More simply, a change in the code can cause all or some of the code to regress from a working state to a failed state. There are various forms of program testing including, for example, unit tests, integration tests and system tests.

One significant challenge that arises when one or more tests fail due to one or more code changes is to trace the failure back to its root cause(s). This task is generally easier to accomplish if the code base is maintained by a single developer, and if the increments across which tests may switch from passing to failing are well delimited and well understood. In reality, however, this is rarely the case as in many instances the code base might be maintained by one or more teams of developers that can be geographically distributed over a wide area.

SUMMARY

In accordance with one non-limiting aspect of this invention there is provided a method, where in a program of interest represented as a sequence of states comprising variables and flags wherein controls transition the program from state to state, wherein the program comprises tests at prescribed locations in the program that are applied upon specific states and generate observables, inserting at different points in the program hooks that capture program runtime behaviors constituting classification features; flattening the program states, commands and tests along a program run-time timeline; and identifying a root cause of a program failure by backtrack analyzing a stream of input states and commands and output consequent states, commands and test results to detect causal correlations between variables, states and commands.

In accordance with another non-limiting aspect of this invention there is provided a computer program product comprised of software instructions on a computer-readable medium. Execution of the software instructions using a computer results in performing operations comprising, where in a program of interest represented as a sequence of states comprising variables and flags wherein controls transition the program from state to state, wherein the program comprises tests at prescribed locations in the program that are applied upon specific states and generate observables, inserting at different points in the program hooks that capture program runtime behaviors constituting classification features; flattening the program states, commands and tests along a program run-time timeline; and identifying a root cause of a program failure by backtrack analyzing a stream of input states and commands and output consequent states, commands and test results to detect causal correlations between variables, states and commands.

In accordance with still another non-limiting aspect of this invention there is provided a system comprised of at least one data processor connected with at least one memory that stores software instructions. In the system execution of the software instructions by the at least one data processor causes the system to operate on a program of interest that is represented as a sequence of states comprising variables and flags wherein controls transition the program from state to state, and wherein the program comprises tests at prescribed locations in the program that are applied upon specific states and generate observables. The system when operating on the program of interest comprises inserting at different points in the program hooks that capture program runtime behaviors constituting classification features; flattening the program states, commands and tests along a program run-time timeline; and identifying a root cause of a program failure by backtrack analyzing a stream of input states and commands and output consequent states, commands and test results to detect causal correlations between variables, states and commands, where the system when backtrack analyzing determines joint conditional probabilities and identifies candidate failure root causes that maximize conditional probabilities.

DETAILED DESCRIPTION

Figure 1:
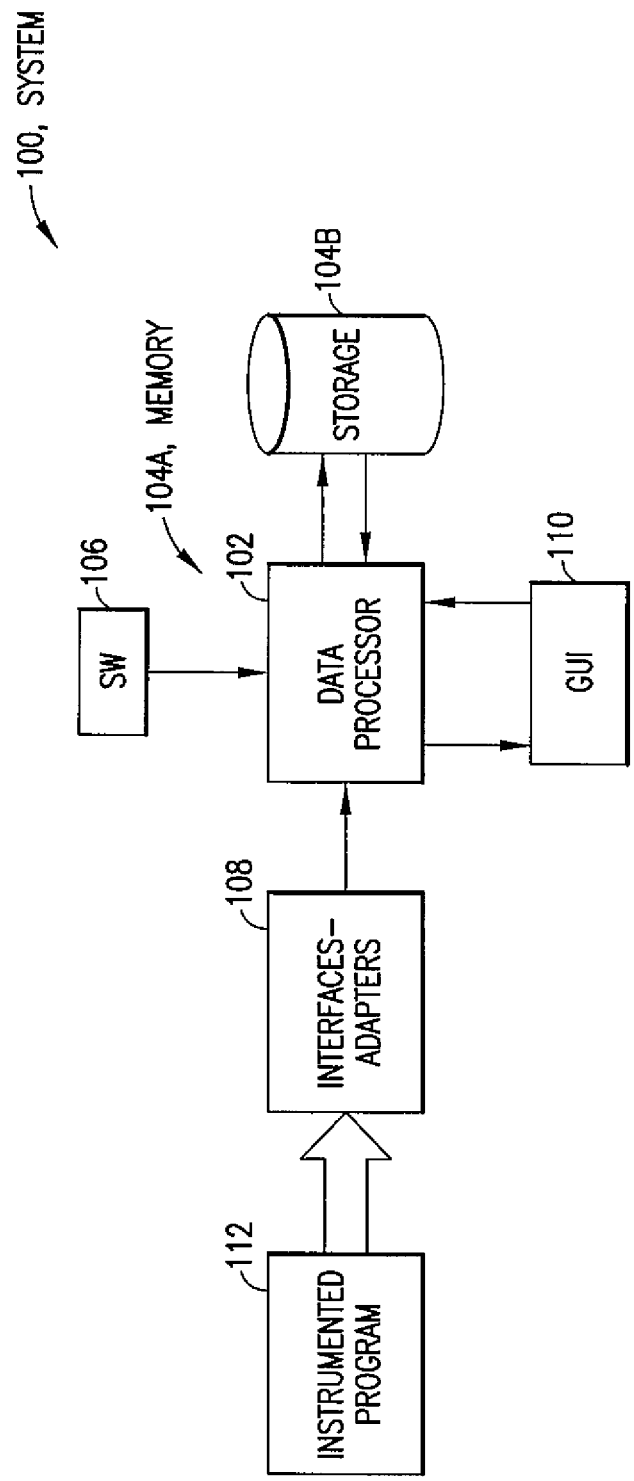
FIG. 1 illustrates a block diagram of a data processing system that represents a non-limiting example of an apparatus that can be used to instantiate this invention.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The embodiments of this invention provide methods, systems, apparatus and computer software (programs) that are operable and configured to determine a root cause of a failure in a computer software program that is being developed, maintained or otherwise operated on by one or more computer programmers.

Software systems developed by large enterprises and commercial organizations typically combine the efforts of multiple individuals and possibly teams of individuals that can be distributed across wide geographic areas. A given computer program code base can change frequently, especially just prior to a release deadline (when there is the least amount of time to debug test failures). The root cause and responsibility for a particular failure can be very difficult to articulate with any degree of accuracy, especially in a large and complex code base.

There exists a body of research in the area of software engineering that pertains to minimization of regression suites, also known as test selection, with the goal being: (a) given a code change, (b) to compute a strict, if not minimal, subset of the available tests that provide the same coverage as the entire suite. Intuitively, other tests can check functionality that is outside of a cone of influence of the change. Another somewhat similar technique is test prioritization, where the goal is not to exclude tests but to simply rank them according to a heuristic measure of priority, or relevance, given the code changes at hand.

While these conventional techniques may be of some use, they each address the problem of optimizing the time and resource costs of running a (potentially large) suite of tests.

The exemplary embodiments of this invention are premised on a different motivation: i.e., rather than reducing the number of tests, or prioritizing their order of execution, the embodiments of this invention seek to gain knowledge of the root cause(s) for failures. In this way it becomes possible to optimize the manual effort needed to review and comprehend, and act on, program test failures.

The exemplary embodiments of this invention provide a method to derive, given a program P and a set $\{t_1, \ldots, t_n\}$ of tests, one or more root causes, expressed in terms of program states, for one or more failures of tests $t_i$. To achieve this capability the problem setting is placed into the space or domain of formal learning. Within this domain success/failure are viewed as classification labels. These are mapped to a multiplicity of code-level features obtained via (automatic) program instrumentation.

More specifically a method inserts into P, at different points within the classes and methods comprising P, lightweight instrumentation hooks that capture program runtime behaviors such as, but not limited to:

(a) the value of a given (live) variable v at position p in the code at time t during execution;

(b) an aliasing status between a pair u and v of (live) variables at position p in the code at time t during execution; and (c) a Boolean statement whether or not a method m has executed at time t.

These facts, or simplifications thereof (e.g., checking whether variable v points either to a live object or to NULL), comprise the classification features. Combined, the classification features and labels provide a complete learning dataset which enables an analysis algorithm to draw the causal links between facts pertaining to the program's state and test failures.

Before proceeding further with the description of the exemplary embodiments of this invention reference will be made to FIG. 1 for showing a block diagram of a data processing configuration or system 100 that is one suitable and non-limiting example of an apparatus that can be used to instantiate this invention. The system 100 includes at least one controller/data processor 102 connected with at least one local memory 104A that stores software (SW) 106. The data processor 102 can also be connected with a storage (e.g., mass storage) 104B. The mass storage 104B can store copies of a code base or code bases of interest, as well as other data.

The software 106 can include those modules and routines that are run by the data processor 102 to perform the derivation of the root cause(s) of a failure in a program under test or development, in accordance with embodiments of this invention.

The data processor 102 is also connected with interfaces/adapters 108, such as communication network interfaces and adapters, are configured to send and receive data. The received data could include a data structure representing a program of interest, such as a program under test or development, referred to in FIG. 1 as an instrumented program 112. The instrumented program 112 can be the one referred to above that is a result of the execution of the method that inserts into the program, at different points within the classes and methods that comprise the program, the lightweight instrumentation hooks that are configured to capture program runtime behaviors. The instrumented program 112 could be received at the system 100 as such, or the method used to instrument the program can be executed locally in the system 100 on the program under test or development.

In general, and by example only, the instrumented program 112 can be an application program, such as one intended to be downloaded to and run on a user's device, or it could be a control program (e.g., an operating system (OS)) intended to control the operation of the user device or some other type of device or system. The instrumented program 112 can be written/expressed in any programming language. It should thus be appreciated that the embodiments of this invention are agnostic with respect to the nature of the program of interest that is instrumented and acted upon by software 106.

Also connected with the at least one controller/data processor 102 is at least one display device/GUI 110 whereby a user, such as a programmer/software developer, can interact with the software 106 during a fault analysis of the instrumented program 112. The display device/GUI 110 can be used to display to the user detected program failures and a portion of the program code that that is determined to be a root cause of the failure, thereby enabling corrective action to be taken. The programmer/software developer may or may not be an author or coauthor of the program of interest.

In general the various components and sub-systems shown in FIG. 1 can be implemented in whole or in part as circuitry and/or as separate special purpose data processor/controllers and/or as software.

The system 100 can be physically instantiated in whole or in part as one or more computers and computing systems at an enterprise, such as at a software/application program development enterprise, or it could be, for example, instantiated at an agency or at an academic institution, or it could be instantiated in whole or in part in a virtual manner in the cloud. In some embodiments of this invention the use of the system 100 can be provided as a service to programmers/software developers and others via data communication networks including the Internet.

In accordance with the embodiments of this invention, consider a dynamic system representation for a given program. Let the state (s) of the program, comprising variables values v_i, flags x_i, etc., be defined as s_i. Commands, methods and input can be considered as controls c_p that affect/transition the program state. Note that unlike classical control theory description, in this case the command index (i.e., which command/program line, p, in the code will be executed next), is a function of the current state. Further, the tests, t_{p,i} at prescribed locations in the code, p, and applied upon specific states i, are treated as observations, also referred to herein as observables (o). For example, one can treat the test output as Boolean (success vs. failure) t_{p,i} (s_i)={0,1}. It is pointed out that other (than Boolean) output configurations (e.g., integer, continuous value, multi-variate) can also be considered for use. In addition, in this configuration it is assumed that part of the state variables, $v\_i$, are observable.

In the context of the embodiments of this invention the context controls (c) could correspond to one of a command executed in the code or input by the user, while the observable (o) could correspond to values of certain variables under consideration, success or failure of tests, etc.

Given the aforementioned setup one can now 'flatten'/lay out the program states, commands and tests description on a run-time timeline dimension, and backtrack-analyze the stream (online or offline) of input (states, commands) and output (consequent states, selected command, test results) to identify variables, states, commands correlations in order to identify failure root causes.

Figure 2:
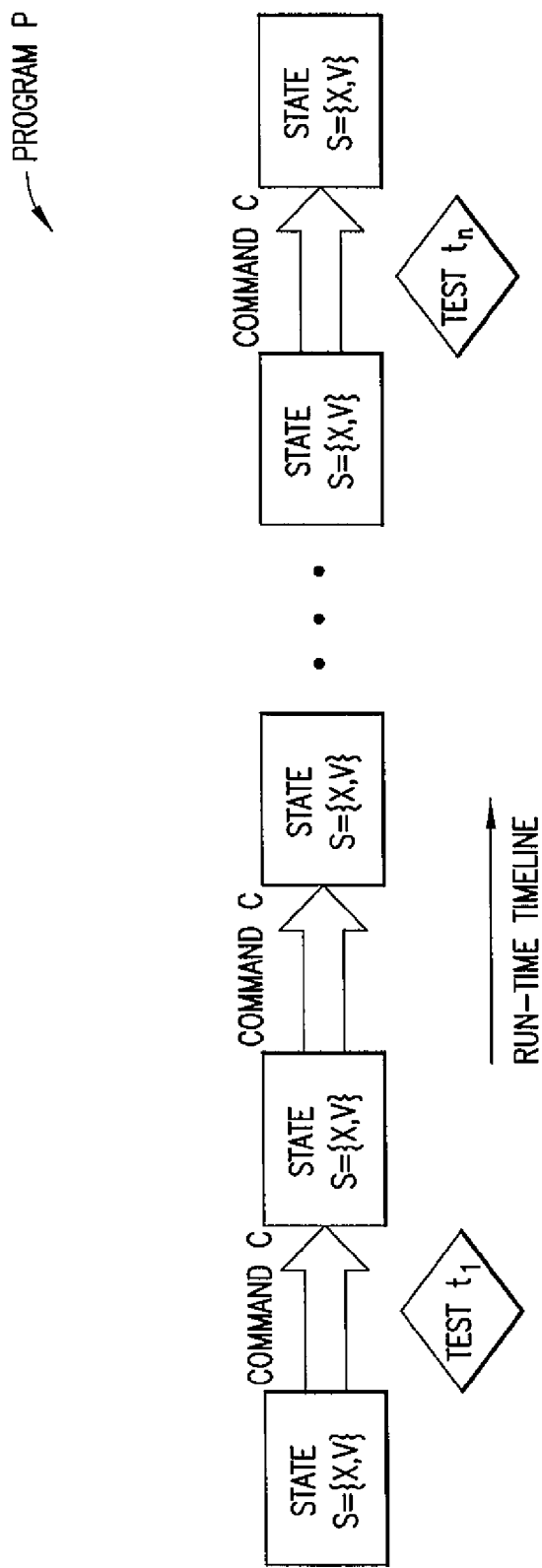
FIG. 2 depicts an example of a process to organize program states on a run-time timeline, where the program states are annotated with controls and observables to identify correlations between a root cause and an effect.

Referring to FIG. 2, the flattening of the program states can involve organizing the program states on the run-time timeline, annotated with controls (e.g. commands, input), observables (tests, variables values), and then identifying correlations between a root cause and an effect.

A unit test suite can be considered to be comprised of multiple tests that target the same module/functionality (with different arguments, contexts, etc.). Through plural instantiations of the unit test, multiple sequences of states, commands, variables and tests can be recorded.

For a failure indication at a state $s\_f$, $t\_p(s\_f)$=failure, the system backtracks and computes (i.e., only consider past states $s\_j$, j<f) joint conditional probabilities $P(t\_\{p,j\}, v\_j|t\_\{p,k\}, \ldots, t\_\{p,j-1\}|)$, k=>1. Candidate root causes are identified, as such, that maximize conditional probabilities of the form $P(t\_p(s\_j)$=failure$|x\_k, v\_k, t\_p(s\_k), \ldots, x\_\{j-1\}, v\_\{j-1\}, t\_p(s\_\{j-1\}))$. The conditional probabilities across state sequences (via joint probabilities), and across unit tests, represent causal correlations. Conditional probabilities of increasing link lengths (number of intermediate states), enable the system to identify the primary root cause since the failure probabilities only change marginally when backtracking beyond (before) the root cause instance. In general one can observe when the computed failure probabilities fall below some threshold.

With respect to a marginal change in the failure probabilities, what is considered as a marginal change can be problem dependent as it depends at least in part upon the number of possibilities forking out from any state, and their respective probabilities. However, if one observes the mean probabilities and their variance then the marginal change will become apparent and stand out.

One relatively simple and non-limiting example is provided below:

1: int i=5;
2: int j=10;
3: compute(i,j); // some irrelevant computation
4: String x=Environment.getVariable("x"); // point of failure; unexpected string value
5: assert (x.contains("http://"));

Any test executing line 4 would fail. In particular, such a test would also execute lines 1-3. Hence, the probability of failure when these lines are executed is the same as with line 4. Going backwards would clearly indicate this and, hence, line 4 would be flagged as the root cause of the failure.

As a slight variant to this example:

1: if (cond( )){
2: int i=5;
3: int j=10;}
4: compute(i,j); // some irrelevant computation
5: String x=Environment.getVariable("x"); // point of failure; unexpected string value
6: assert (x.contains("http://"));

Assume in this case that when an execution reaches line 1, then in >90% of the cases the condition evaluates to true. Hence, there is only a small difference in failure probability between execution of lines 2-3 and execution of line 4, and backward traversal would indicate (per a specified threshold) that line 4 is the root cause of the failure.

In general the system 100 observes the conditional probabilities across a single step (i.e., a change from one state to another state due to a single control), and then performs the same observation of conditional probabilities between states that are two steps apart, then three steps apart, etc. As the probabilities of failure are strongly affected by the root cause, one can expect to see such correlations in the conditional probabilities up to the length-scale of the root cause. However, going further backwards along the run-time timeline would demonstrate that the failure probability would be indifferent (i.e., not sensitive) to actions (controls) and states (observables) occurring prior to the root cause of the failure.

For example, assume a failure in a state 8, indicated by a failure test $t\_p(s\_8)$=failure. Further assume that a root cause associated with the failure in state 8 incurred 3 states beforehand, corresponding to control $c\_5$. The system first computes the failure probability conditioned to the controls and observables (o) of state $c\_7$:

$$P(t\_p(s\_8)=\text{failure}|c\_7,o\_7).$$

Since the root cause occurred already in state 5, variability of the values of $c\_7$ and $o\_7$ does not dramatically affect the conditional probability. The system then backtracks one step further:

$$P(t\_p(s\_8)=\text{failure}|o\_6,c\_6,c\_7,o\_7).$$

One can observe a similar indifference to the joint distribution of the values of $o\_6$ and $c\_7$ with the $c\_7$ and $o\_7$. The system then backtracks one step further:

$$P(t\_p(s\_8)=\text{failure}|o\_5,c\_5,o\_6,c\_6,c\_7,o\_7).$$

As state 5 involves the root cause, variability in the values of $c\_5$ would affect the failure outcome, and therefore, a notable change in the value of the conditional probability is expected. This notable change is indicative that a root cause has been identified. The system can then backtrack one step further to assess (and bracket) the root cause:

$$P(t\_p(s\_8)=\text{failure}|o\_4,c\_4,o\_5,c\_5,o\_6,c\_6,c\_7,o\_7).$$

At this point the value of the conditional probability is likely to be sustained, unless another root cause emerges further back.

The embodiments of this invention can be seen to locate fine-grained and localized explanations for test failures at the level of variable and field values. This beneficial result of the execution of the methods in accordance with this invention is based on maintaining and tracking predictions using a statistical sampling strategy with multiple different tests.

Further in this regard, the detection of root causes employs exploration of the state space trajectories, and an examination of the respective outcomes (response) of the code execution. In this context the samples refer to instants of the code with various input parameters. It is typically the case that an exhaustive, comprehensive examination of the entire scenario space (a run with a given set of inputs) is prohibitive computationally. As such samples of that space can be used, weighted by the respective probabilities of occurrence of each scenario (such distribution can be biased deliberately to account for critical scenarios which may not be highly frequent, but their proper execution is of higher priority to the integrity of the code). In this manner the root cause can be identified, while investing an amount of respective effort in their identification per their frequency of criticality.

Figure 3:
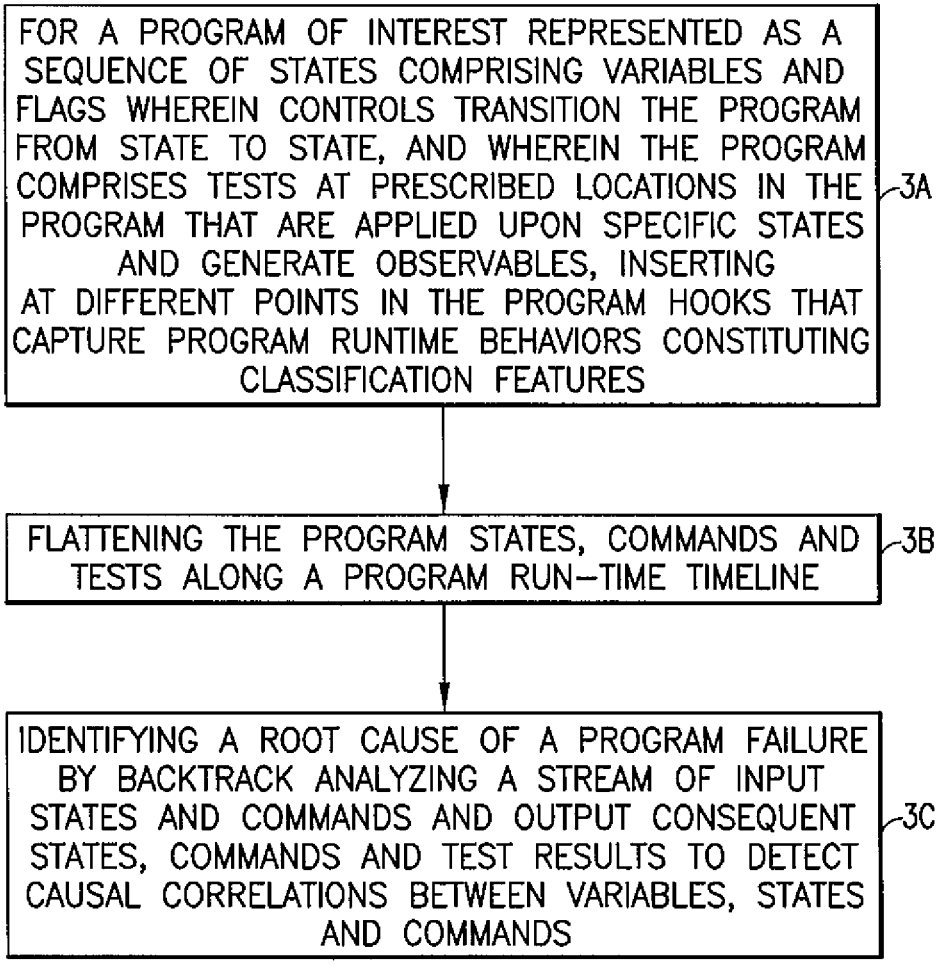
FIG. 3 is a logic flow diagram showing an example of a method in accordance with the embodiments of this invention.

FIG. 3 is a logic flow diagram, e.g., a flowchart that illustrates the operation of a method, as well as the execution of a computer program product, in accordance with the representative embodiments of this invention.

At Block 3A there is performed for a program of interest represented as a sequence of states comprising variables and flags wherein controls transition the program from state to state, and wherein the program comprises tests at prescribed locations in the program that are applied upon specific states and generate observables, a step of inserting at different points in the program hooks that capture program runtime behaviors constituting classification features.

At Block 3B there is performed a step of flattening the program states, commands and tests along a program runtime timeline.

At Block 3C there is performed a step of identifying a root cause of a program failure by backtrack analyzing a stream of input states and commands and output consequent states, commands and test results to detect causal correlations between variables, states and commands.

The step of backtrack analyzing includes determining joint conditional probabilities and identifying candidate failure root causes that maximize conditional probabilities.

More specifically, in the operation of the method, as well as the execution of the computer program product, in accordance with the flowchart of FIG. 3, the step of backtrack analyzing comprises, for a failure indication at a state $s\_f$, $t\_p(s\_f)$=failure, backtracking and computing, considering only past states $s\_j$, $j<f$, joint conditional probabilities $P(t\_\{p,j\},v\_j|t\{p,k\}, \ldots, t\_\{p,j-1\}|)$, $k=>1$, where candidate root causes are identified that maximize conditional probabilities of the form $P(t\_p(s\_j)$=failure$|x\_k, v\_k, t\_p(s\_k), \ldots, x\_\{j-1\}, v\_\{j-1\}, t\_p(s\_\{j-1\}))$.

In the operation of the method, as well as the execution of the computer program product, in accordance with the flowchart of FIG. 3, where conditional probabilities across state sequences, and across unit tests, represent the causal correlations, and where the conditional probabilities are determined for increasing link lengths represented by increased numbers of intermediate states.

In the operation of the method, as well as the execution of the computer program product, in accordance with the flowchart of FIG. 3, where a state containing a failure root cause is detected while backtracking when a change in computed failure probabilities falls below a threshold value.

In the operation of the method, as well as the execution of the computer program product, in accordance with the flowchart of FIG. 3, where the runtime behaviors comprise at least one of:

the value of a given (live) variable v at position p in the program at time t during execution of the program of interest;

the runtime behaviors comprise an aliasing status between a pair u and v of variables at position p in the code at time t during execution of the program of interest; and a statement whether or not a method m has executed at time t during execution of the program of interest.

In the operation of the method, as well as the execution of the computer program product, in accordance with the flowchart of FIG. 3, where a command index indicating which command/program line will be executed next is a function of a current state.

The present invention may thus be embodied as one or more of a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method, comprising:
    operating, by at least one data processor, on a program of interest represented as a sequence of states comprising variables and flags, where controls transition the program of interest from state to state, where the program of interest comprises tests at prescribed locations in the program of interest that are applied upon specific states and generates observables, and where operating on the program of interest comprises inserting, by the at least one data processor, at different points in the program of interest, hooks that capture program runtime behaviors constituting classification features;
    flattening, by the at least one data processor, the sequence of states of the program of interest, commands, and tests along a program run-time timeline; and
    identifying, by the at least one data processor, a root cause of a program failure by backtrack analyzing a stream of input states and commands and output consequent states, commands, and test results to detect causal correlations between variables, states, and commands, where the step of backtrack analyzing comprises determining, by the at least one data processor, joint conditional probabilities and identifying, by the at least one data processor, candidate failure root causes that maximize conditional probabilities.

2. The method as in claim 1, where backtrack analyzing comprises, for a failure indication at a state $s\_f$, $t\_p(s\_f)=$ failure, backtracking and computing, considering only past states $s\_j$, $j<f$, joint conditional probabilities $P(t\_\{p,j\}, v\_j | t\_\{p,k\}, \ldots, t\_\{p,j-1\}|)$, $k=>1$, and where candidate failure root causes are identified that maximize conditional probabilities of the form $P(t\_p(s\_j)=failure | x\_k, v\_k, t\_p(s\_k), \ldots, x\_\{j-1\}, v\_\{j-1\}, t\_p(s\_\{j-1\}))$.

3. The method as in claim 2, where conditional probabilities across the sequence of states of the program of interest, and across unit tests, represent the causal correlations, and where the conditional probabilities are determined for increasing link lengths represented by increased numbers of intermediate states.

4. The method as in claim 2, where a state containing a failure root cause is detected while backtrack analyzing when a change in computed failure probabilities falls below a threshold value.

5. The method as in claim 1, where the program runtime behaviors comprise the value of a given (live) variable v at position p in the program of interest at time t during execution of the program of interest.

6. The method as in claim 1, where the program runtime behaviors comprise an aliasing status between a pair u and v of variables at position p in the program of interest at time t during execution of the program of interest.

7. The method as in claim 1, where the program runtime behaviors comprise a statement whether or not a method m has executed at time t during execution of the program of interest.

8. A computer program product comprised of software instructions stored on a computer-readable storage medium, where execution of the software instructions using a computer results in performing operations comprising:
operating, by at least one data processor, on a program of interest represented as a sequence of states comprising variables and flags, where controls transition the program of interest from state to state, where the program of interest comprises tests at prescribed locations in the program of interest that are applied upon specific states and generates observables, and where operating on the program of interest comprises inserting, by the at least one data processor, at different points in the program of interest, hooks that capture program runtime behaviors constituting classification features;
flattening, by the at least one data processor, the sequence of states of the program of interest, commands, and tests along a program run-time timeline; and
identifying, by the at least one data processor, a root cause of a program failure by backtrack analyzing a stream of input states and commands and output consequent states, commands, and test results to detect causal correlations between variables, states, and commands, where backtrack analyzing comprises determining, by the at least one data processor, joint conditional probabilities and identifying, by the at least one data processor, candidate failure root causes that maximize conditional probabilities.

9. The computer program product as in claim 8, where backtrack analyzing comprises, for a failure indication at a state s_f, t_p(s_f)=failure, backtracking and computing, considering only past states s_j, j<f, joint conditional probabilities $P(t\_\{p,j\}, v\_j | t\_\{p,k\}, \ldots, t\_\{p,j-1\}|)$, k=>1, and where candidate failure root causes are identified that maximize conditional probabilities of the form $P(t\_p(s\_j)=failure | x\_k, v\_k, t\_p(s\_k), \ldots, x\_\{j-1\}, v\_\{j-1\}, t\_p(s\_\{j-1\}))$.

10. The computer program product as in claim 9, where conditional probabilities across the sequence of states of the program of interest, and across unit tests, represent the causal correlations, and where the conditional probabilities are determined for increasing link lengths represented by increased numbers of intermediate states.

11. The computer program product as in claim 9, where a state containing a failure root cause is detected while backtrack analyzing when a change in computed failure probabilities falls below a threshold value.

12. The computer program product as in claim 8, where the program runtime behaviors comprise the value of a given (live) variable v at position p in the program of interest at time t during execution of the program of interest.

13. The computer program product as in claim 8, where the program runtime behaviors comprise an aliasing status between a pair u and v of variables at position p in the program of interest at time t during execution of the program of interest.

14. The computer program product as in claim 8, where the program runtime behaviors comprise a statement whether or not a method m has executed at time t during execution of the program of interest.

15. A system, comprised of at least one data processor connected with at least one memory that stores software instructions, where execution of the software instructions by the at least one data processor causes the system to:
operate, by the at least one data processor, on a program of interest represented as a sequence of states comprising variables and flags, where controls transition the program of interest from state to state, where the program of interest comprises tests at prescribed locations in the program of interest that are applied upon specific states and generates observables, and where operating on the program of interest comprises inserting, by the at least one data processor, at different points in the program of interest, hooks that capture program runtime behaviors constituting classification features;
flatten, by the at least one data processor, the sequence of states of the program of interest, commands, and tests along a program run-time timeline; and
identify, by the at least one data processor, a root cause of a program failure by backtrack analyzing a stream of input states and commands and output consequent states, commands, and test results to detect causal correlations between variables, states, and commands, where the system, when backtrack analyzing, determines, by the at least one data processor, joint conditional probabilities and identifies, by the at least one data processor, candidate failure root causes that maximize conditional probabilities.

16. The system as in claim 15, where backtrack analyzing comprises, for a failure indication at a state s_f, t_p(s_f)=failure, backtracking and computing, considering only past states s_j, j<f, joint conditional probabilities $P(t\_\{p,j\}, v\_j | t\_\{p,k\}, \ldots, t\_\{p,j-1\}|)$, k=>1, and where candidate failure root causes are identified that maximize conditional probabilities of the form $P(t\_p(s\_j)=failure | x\_k, v\_k, t\_p(s\_k), \ldots, x\_\{j-1\}, v\_\{j-1\}, t\_p(s\_\{j-1\}))$.

17. The system as in claim 16, where conditional probabilities across the sequence of states of the program of interest, and across unit tests, represent the causal correlations, where the conditional probabilities are determined for increasing link lengths represented by increased numbers of intermediate states, and where a state containing a failure root cause is detected while backtrack analyzing when a change in computed failure probabilities falls below a threshold value.

18. The system as in claim 15, where the program runtime behaviors comprise at least some of:
the value of a given (live) variable v at position p in the program of interest at time t during execution of the program of interest;

an aliasing status between a pair u and v of variables at position p in the program of interest at time t during execution of the program of interest; and a statement whether or not a method m has executed at time t during execution of the program of interest.

* * * * *